(12) United States Patent  (10) Patent No.: US 9,148,478 B2
Cakulev et al.  (45) Date of Patent: Sep. 29, 2015

(54) VERIFICATION OF INTEGRITY OF PEER-RECEIVED CONTENT IN A PEER-TO-PEER CONTENT DISTRIBUTION SYSTEM

(75) Inventors: Violeta Cakulev, Millburn, NJ (US); Semyon B. Mizikovsky, Morganville, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 571 days.

(21) Appl. No.: 13/344,985

(22) Filed: Jan. 6, 2012

(65) Prior Publication Data

US 2013/0104249 A1   Apr. 25, 2013

Related U.S. Application Data

(60) Provisional application No. 61/551,056, filed on Oct. 25, 2011.

(51) Int. Cl.
*H04L 29/06* (2006.01)
*H04L 29/08* (2006.01)

(52) U.S. Cl.
CPC ...... *H04L 67/1063* (2013.01); *H04L 29/06857* (2013.01); *H04L 29/06863* (2013.01); *H04L 63/08* (2013.01); *H04L 63/12* (2013.01)

(58) Field of Classification Search
CPC ......... H04L 9/32; H04L 9/3202; H04L 9/321; H04L 9/3213; H04L 9/3223; H04L 29/06857; H04L 29/06863; H04L 29/08; H04L 29/06; H04L 63/12; H04L 63/123; H04L 67/104

USPC .................... 726/2–5, 9, 12, 26–30; 713/165, 713/167–170, 172, 175–176, 181; 380/262; 705/57–58; 707/967
See application file for complete search history.

(56) References Cited

U.S. PATENT DOCUMENTS

| | | | |
|---|---|---|---|
| 6,330,670 B1 | 12/2001 | England et al. | |
| 7,266,569 B2 | 9/2007 | Cutter et al. | |
| 7,676,042 B2 | 3/2010 | Okamoto et al. | |
| 2003/0084003 A1* | 5/2003 | Pinkas et al. | 705/71 |
| 2003/0233455 A1 | 12/2003 | Leber et al. | |
| 2007/0074019 A1* | 3/2007 | Seidel | 713/156 |

(Continued)

FOREIGN PATENT DOCUMENTS

| | | |
|---|---|---|
| EP | 2302536 A1 | 3/2011 |
| JP | 2002359616 A | 12/2002 |

(Continued)

OTHER PUBLICATIONS

PCT/US2012/061360 Notification of Transmittal of the International Search Report and the Written Opinion of the International Searching Authority, or the Declaration dated Apr. 18, 2013.

(Continued)

*Primary Examiner* — Eleni Shiferaw
*Assistant Examiner* — Hilary Branske
(74) *Attorney, Agent, or Firm* — Steven R. Santema

(57) ABSTRACT

Structures and methods are disclosed for verifying integrity of peer-supplied content in a peer-to-peer content distribution system, for example, to verify that content supplied from a sending peer node to a receiving peer node corresponds to the content that was requested by the receiving node.

12 Claims, 5 Drawing Sheets

(56) References Cited

U.S. PATENT DOCUMENTS

2007/0150596 A1\* 6/2007 Miller et al. ................ 709/226
2007/0220261 A1   9/2007 Farrugia et al.
2010/0138396 A1\* 6/2010 Kikkawa ..................... 707/674
2014/0259166 A1\* 9/2014 Ghaskadvi et al. ............ 726/23

FOREIGN PATENT DOCUMENTS

| JP | 2007242231 A | 9/2007 |
| JP | 2010033145 A | 2/2010 |
| JP | 2010033469 A | 2/2010 |
| JP | 2011526754 A | 10/2011 |

OTHER PUBLICATIONS

H. Schulzrinne, Columbia University; E. Marocco, Telecom Italia; E. Ivov, SIP Communicator "Security Issues and Solutions in Peer-to-Peer Systems for Realtime Communications"; Internet Research Task Force (IRTF); Request for Comments: 5765; ISSN: 2070-1721; Feb. 23, 2010, pp. 1-28; Geneva, Switzerland.

Jie Kong et al, "A Study of Pollution on BitTorrent", Computer and Automation Engineering (ICCAE) 2010 the 2nd International Conference on, IEEE, Piscataway, NJ, USA, Feb. 26, 2010, pp. 118-122; ISBN 978-1-4244-5585-0.

\* cited by examiner

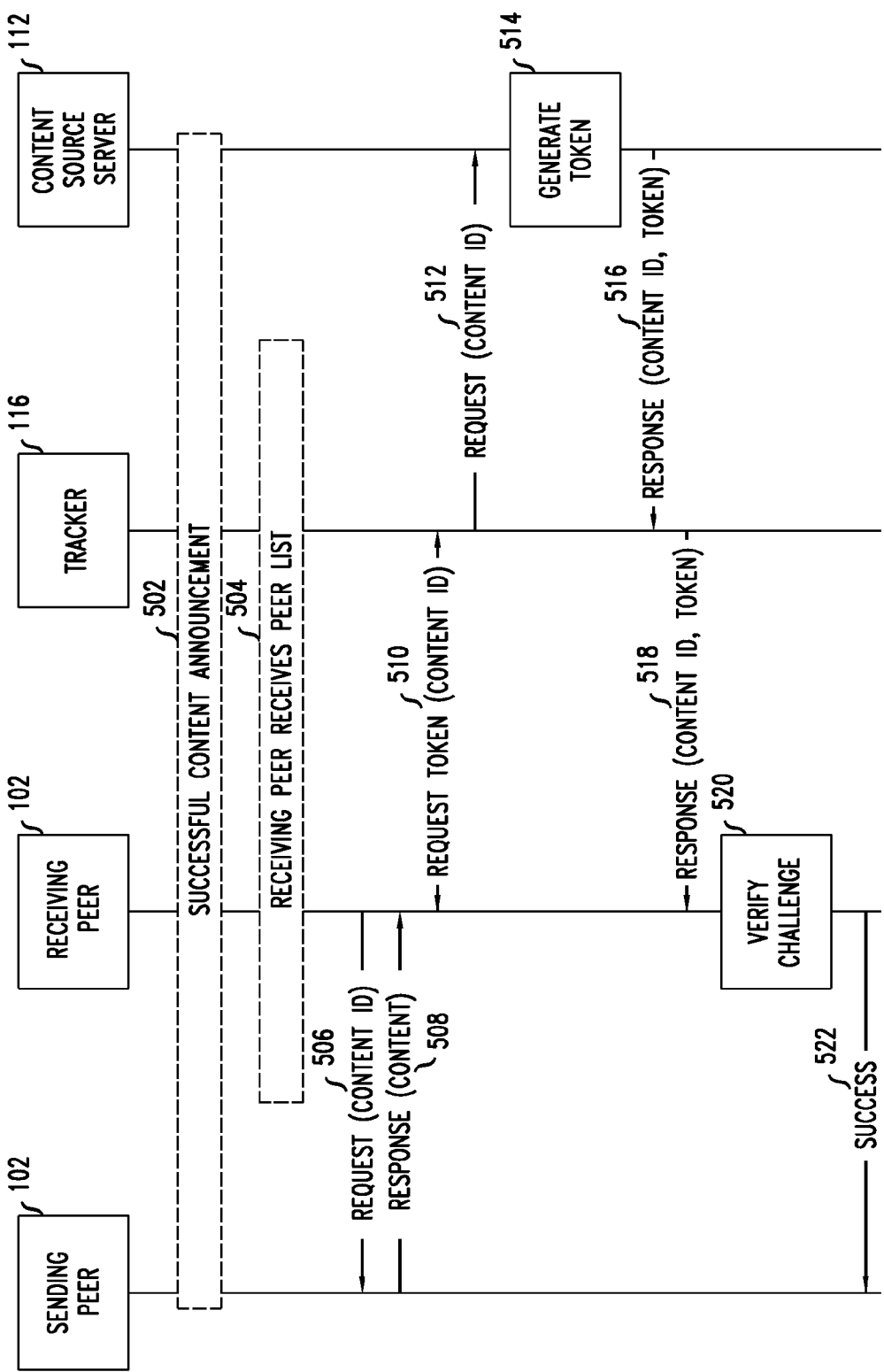

VERIFICATION OF INTEGRITY OF PEER-RECEIVED CONTENT IN A PEER-TO-PEER CONTENT DISTRIBUTION SYSTEM

CROSS-REFERENCE TO RELATED APPLICATIONS

The present application claims priority to the U.S. provisional patent application identified as Ser. No. 61/551,056, filed on Oct. 25, 2011, and titled, "Security Features for IMS-Based Content Distribution Services," the disclosure of which is incorporated by reference herein in its entirety.

The present application is related to U.S. patent application Ser. No. 13/344,826, titled "Verification of Content Possession by an Announcing Peer in a Peer-to-Peer Content Distribution System," filed concurrently with the present application and assigned to the assignee of the present invention.

FIELD OF THE INVENTION

This invention relates generally to multimedia data security and, more particularly, to techniques for enhancing peer-to-peer content distribution services in a multimedia data network (e.g., including IMS-based networks).

BACKGROUND OF THE INVENTION

The demand for multimedia content distribution services (e.g., live streaming and content-on-demand) has increased tremendously in recent years in view of the development of fixed and mobile broadband technologies and more and more powerful mobile handsets. To satisfy this explosive demand, and to overcome bandwidth and quality limitations associated with the use of centralized media servers, there is a need to deploy more and more edge servers close to the end users. One way to address this need is to use peer-to-peer (P2P) technology.

Generally, peer-to-peer technology relies on a distributed set of end-nodes (called peers) to interact with each other and share resources to perform some task or objective so as to reduce demands on centralized resources. For example, in the case of multimedia content distribution, peer-to-peer technology may be utilized to offload storage and bandwidth demands from centralized servers to edge servers and, to the extent end user equipment capabilities permit, to user equipment (UEs). In one example, the edge servers can handle media content requests from UEs served locally, as well as requests from neighboring edge servers. Similarly, if the UE's capabilities permit, UEs can offer spare uplink bandwidth, storage space and other resources to other peer UEs. In addition, the content can be transmitted in a segmented manner and most of the traffic can be spread across the edge of the network. All this contributes to reduced storage and bandwidth demands on centralized servers, as well as improved system capability that scales well with the increasing number of edge servers and UEs.

However, although P2P is a promising model for multimedia content distribution services, there are security issues that still need to be addressed. In one aspect, there is a need to verify content possession by end users (i.e., to verify that content advertised by a prospective content-supplier peer is indeed possessed by the advertising peer). This threat is addressed by related U.S. patent application Ser. No. 13/344,826. In another aspect, a threat exists following a successful advertisement of content that the announcing peer may maliciously (or perhaps mistakenly) share content with a receiving peer that is different in some way from the advertised or requested content. Accordingly, there is a need to verify integrity of peer-supplied content, for example, to verify that content supplied from a sending peer to a receiving peer corresponds to the content that was requested by the receiving peer.

SUMMARY OF THE INVENTION

This problem is addressed and a technical advance is achieved in the art by a peer-to-peer content distribution system incorporating a tracker node logically connected to a plurality of peer nodes, the peer nodes including a sending node and a receiving node.

In one embodiment, there is provided a method carried out by the tracker node to verify integrity of peer-received content received at a receiving node, the received content having been received by the receiving node from the sending node responsive to a request for an advertised content item. The method comprises receiving, from the receiving node, a request for a verification token associated with the received content item, the request for verification token including indicia of the advertised content item. The tracker node obtains a verification token based on a random portion of the advertised content item. The tracker node may itself generate the verification token, for example by obtaining the advertised content item, selecting a random portion of the advertised content item and performing a hash of the random portion, yielding the verification token; or alternatively, the tracker node may request a verification token generated by a content storage node possessing the advertised content item. Having obtained the verification token, the tracker node sends the token to the receiving node which is operable thereafter to generate a second token based on a corresponding random portion of the received content item and verify, unbeknownst to the sending node, that the received content item matches the advertised content item if the second token matches the verification token.

In yet another embodiment, there is provided an apparatus for verifying integrity of peer-received content received at a receiving node, in accordance with a peer-to-peer content distribution system including a plurality of peer nodes operably linked to a tracker node. The apparatus at the tracker node comprises a peer node interface; a content storage node interface; a memory; and at least one processor operably coupled to the peer node interface, content storage node interface and memory. The processor is configured to: (a) receive, from the receiving node, a request for a verification token associated with a received content item, the received content item having been received from a sending node responsive to a request for an advertised content item, the request for verification token including indicia of the advertised content item; (b) obtain a verification token based on a random portion of the advertised content item; and (c) send, to the receiving node, a response including the verification token, indicia of the advertised content item and indicia of the random portion of the advertised content item from which the token was generated, the receiving node thereafter being operable to (1) generate a second token based on a corresponding random portion of the received content item and (2) verify that the received content item matches the advertised content item if the second token matches the verification token. The processor at part (b) may itself generate the verification token, for example by obtaining the advertised content item, selecting a random portion of the advertised content item and performing a hash of the random portion, yielding the verification token; or alternatively, the tracker node may obtain a verification token generated by a content storage node possessing the advertised content item.

In still another embodiment, there is provided a method carried out by the receiving node to verify integrity of peer-received content received at the receiving node. The method comprises receiving, from the sending node, a received content item responsive to requesting an advertised content item; sending, to the tracker node, a request for a verification token associated with a received content item, the request for verification token including indicia of the advertised content item; responsive to the request, receiving a verification token based on a random portion of the advertised content item; generating a second token based on a corresponding random portion of the received content item and; verifying, unbeknownst to the sending node, that the received content item matches the advertised content item if the second token matches the verification token.

In still yet another embodiment, there is provided an apparatus for verifying integrity of peer-received content received at a receiving node, in accordance with a peer-to-peer content distribution system including a plurality of peer nodes operably linked to a tracker node. The apparatus at the receiving node comprises a memory and at least one processor operably coupled to the memory. The processor is configured to (a) receive, from the sending node, a received content item responsive to requesting an advertised content item; (b) send, to the tracker node, a request for a verification token associated with a received content item, the request for verification token including indicia of the advertised content item; (c) responsive to the request, receive a verification token based on a random portion of the advertised content item; (d) generate a second token based on a corresponding random portion of the received content item and; (e) verify that the received content item matches the advertised content item if the second token matches the verification token.

BRIEF DESCRIPTION OF THE DRAWINGS

The foregoing and other advantages of the invention will become apparent upon reading the following detailed description and upon reference to the drawings in which:

FIG. 5 illustrates a message sequence for verification of integrity of peer-supplied content according to another embodiment of the invention.

DESCRIPTION OF THE PREFERRED EMBODIMENT(S)

For ease of reference, the detailed description is divided as follows. Section I provides an overview of an IMS-based Peer-to-Peer Content Distribution System. Section II describes illustrative use cases of an IMS-based Peer-to-Peer Content Distribution System in which principles of the present invention may be applied. Section III describes a solution for verification of integrity of peer-supplied content in an IMS-based P2P content distribution system.

I. Overview of an IMS-Based P2P Content Distribution System.

Internet Multimedia Subsystem (IMS), standardized by the $3^{rd}$ Generation Partnership Project (3GPP or 3GPP2), generally defines a next-generation architecture for providing multimedia services to converged networks (i.e., having mobile users as well as fixed-access users). IMS uses IP (Internet Protocol), and more specifically uses Session Initiation Protocol (SIP) as the communication protocol. Recently 3GPP has started studying how to use the IMS infrastructure to provide IMS-based Peer-to-Peer (P2P) Content Distribution Services.

Figure 1:
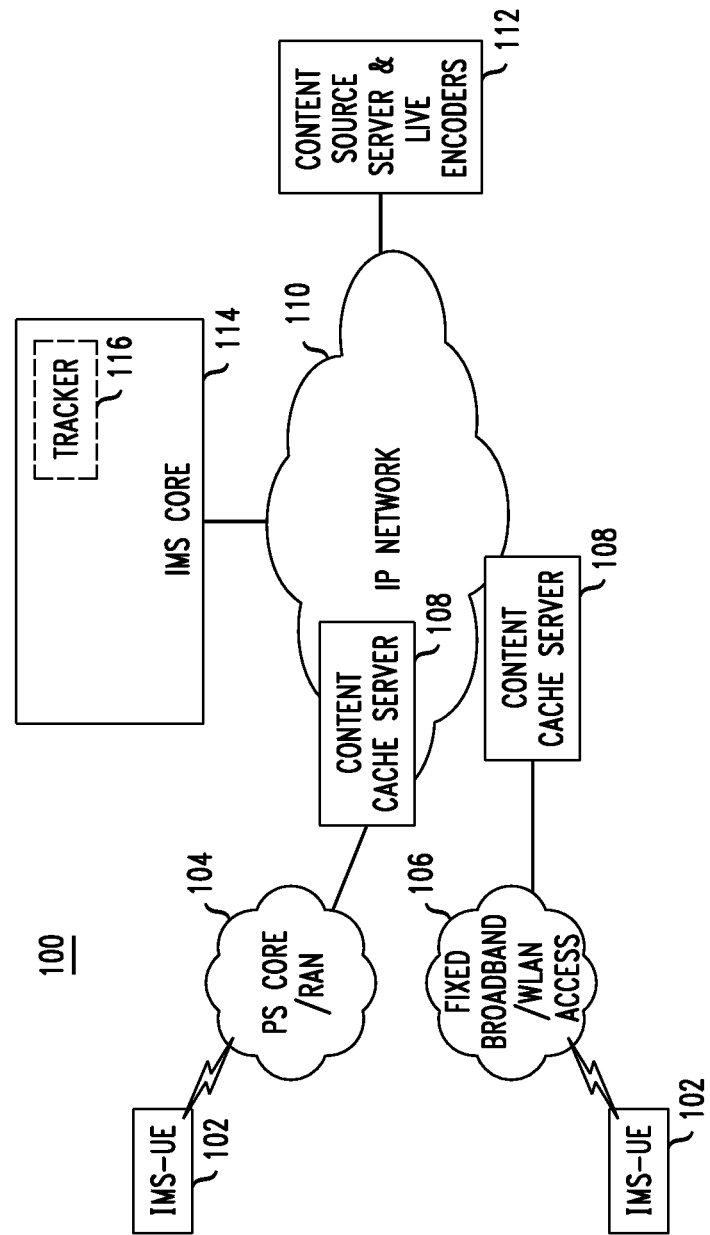
FIG. 1 illustrates an exemplary IMS-based communication network in which embodiments of the present invention may be implemented.

FIG. 1 illustrates an exemplary IMS-based communication network 100 for providing P2P Content Distribution Services. The communication network 100 includes one or more user platforms 102 interconnected by access networks 104, 106, to one or more content servers 108 of an IP Data Network 110. In the exemplary communication network 100, the content servers 108 comprise content cache servers at the edge of the IP network (i.e., close to the user platforms 102), in contrast to a centralized content source server 112, so as to provide multimedia content to end users while reducing demands on the centralized content source server 112.

The user platforms 102 ("IMS UE") may comprise, for example, laptop computers, desktop computers or mobile computing devices that are subject to operation by users to request multimedia content from the content servers 108; and if the UE capabilities permit, to store multimedia content and/or provide multimedia content to other user platforms.

The access networks 104, 106 comprise generally any type of access network, including wireless or fixed access networks. In the exemplary communication network 100, the access networks 104, 106 comprise a packet-switched/radio access network (PS Core/RAN) 104 and a fixed broadband/WLAN access network 106.

The centralized content source server 112 comprises generally any server, platform, system, application or function, nominally operated by a primary content provider and situated at a centralized location relative to the user platforms 102, that is adapted to generate, store and distribute primary content items. Examples of content providers include, for example, movie or television production or distribution companies and the primary content items may comprise, without limitation, movies, live streaming events, etc. Typically, to the extent that the primary content items may be divided into smaller segments, the centralized source server maintains or has access to the entirety (i.e., all segments) of the primary content.

The content cache servers 108 comprise generally any servers, platforms, systems, applications or functions, nominally situated at an edge of the network (i.e., close to the user platforms 102), adapted to receive multimedia content originating from the centralized content source server 112 for distribution to other content cache servers or user platforms. To the extent that content items may be segmented into portions, individual content cache servers 108 may receive and distribute less than the entirety of the primary content items maintained at the centralized content server.

The IP Data Network 110 comprises any packet-based network adapted to support content distribution between and among the content cache servers 108 and the centralized content source server 112 and the user platforms 102. In the exemplary communication network 100, the IP Data Network 110 is an IMS-based network and a portion of the network is referred to as the IMS Core 114. Generally, message traffic in the IMS-based communication network 100 may be characterized in either of two functional planes: a control plane for signaling traffic and a bearer plane for bearer traffic, such as multimedia content. Conceptually, the IMS Core 114 is the portion of the network for managing control traffic and the IP Data Network 110 is the portion of the network 100 for communicating bearer traffic.

The user platforms 102 communicate with the IMS Core 114 to accomplish, without limitation, SIP registrations, SIP session requests, user authentication; and, where applicable, to initiate content distribution services. To the extent the UE capabilities permit, individual user platforms 102 may participate in a peer-to-peer model to receive content from other user platforms and/or distribute content to other user platforms. In this context, user platforms participating to receive and/or distribute content are referred to as "Peers."

In one embodiment, the IMS Core 114 includes functional elements associated with content distribution services to accomplish, without limitation, client enrollment, content indexing, browsing and searching functionalities. In one aspect, the IMS Core includes a tracker node 116 that "tracks" content items possessed by various user platforms 102, by maintaining a list or the like of content items or segments possessed by the respective platforms. The tracker node might also track content items possessed by cache servers 108.

The tracker node 116 is generally defined as any hardware device, server, application or function logically connected to the user platforms 102, cache servers 108 and the content source server 112 that is operable to track content items possessed by the user platforms 102 and, according to embodiments of the present invention, to verify content that is claimed to be possessed by a user platform 108. The tracker node 116 may reside in a single device or platform or may be distributed among multiple devices or platforms. The logical hardware configuration (not shown) of the tracker node includes a processor and memory, a peer node interface and a content storage node interface for effecting communication with logically connected nodes and for performing tracking and verification functions. The tracking and verification functions may be performed, for example and without limitation, by the processor executing program code (e.g., including but not limited to operating system firmware/software and application software) stored in the memory.

II. Illustrative Use Cases of an IMS-Based P2P Content Distribution System.

A. Use Case 1: Live Streaming Service for Multiple Online Users

Figure 2:
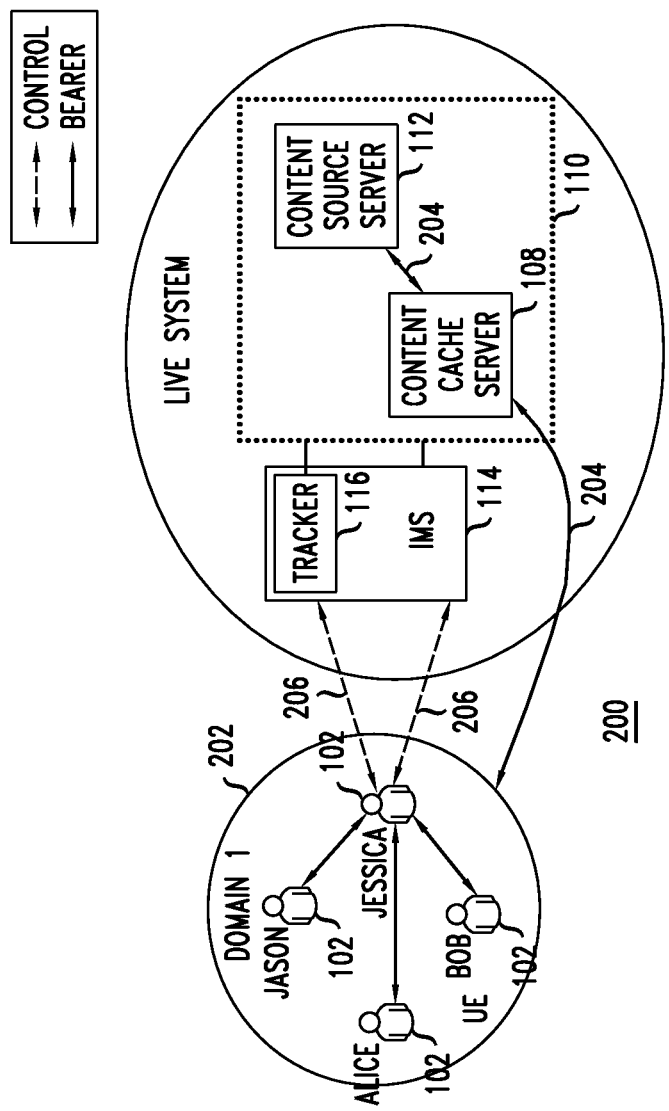
FIG. 2 depicts an example use of an IMS-based P2P Content Distribution System for providing live streaming of content to multiple online users.

FIG. 2 is an illustration of the use of an IMS-based P2P Content Distribution System 200 for Live Streaming of Content to Multiple Online Users. For convenience, like elements of FIG. 2 relative to FIG. 1 will be identified with the like reference numerals.

A plurality of user icons 102 represent multiple online users (and UE) operating within a logical domain 202 ("Domain 1"). The user icons 102 identify four IMS subscribers, Jessica, Bob, Jason and Alice. The domain 202 may comprise, for example, a geographical domain of an IMS service provider. The users 102 access multimedia service and content by communicating with an IP Data Network 110 and IMS Core 114. As described generally in relation to FIG. 1, the IP Data Network includes a content cache server 108 and a content source server 112 for distributing multimedia content; and the IMS Core 114 includes various functional elements, including, without limitation, a tracker 116 to perform functions such as client enrollment, content indexing, browsing and searching functions. Bearer traffic 204 is denoted by solid lines and control traffic 206 is denoted by dashed lines.

In the example use case, it is presumed that Jessica desires to watch a basketball game that starts at 8pm and she notices from a pushed advertisement on her IMS streaming client (UE) that "IMS Live Channel" can broadcast the game. So she decides to watch the game from the IMS Live Channel.

(1) Around 8 pm, Jessica starts her IMS streaming client and begins the IMS registration process. After Jessica finishes her registration, the IMS streaming service delivers information of IMS live broadcast channels to the client. Jessica searches and selects the IMS live broadcast channel associated with the basketball game that she wants to watch from the list of IMS live broadcast channels, thereby indicating to the IMS streaming client that she wants to begin watching the basketball game.

(2) After receiving Jessica's request, the IMS streaming service can't provide access to IP multicast services for some reason (e.g., capacity bottleneck or the access router doesn't support IP multicast functionality), so it turns to application level multicast based on the Peer-to-Peer model to offer the basketball game with a small delay. The multicast Peer-to-Peer service queries the locations of the channel resources of the basketball game and sends to Jessica a list of the resource locations. For purpose of example, in the beginning only the content cache server 108 has cached the basketball game, so the IMS streaming service tells Jessica that she may stream the basketball game from the content cache server 108. Note that the streaming basketball game content is continuously being segmented into fixed-length parts.

(3) Jessica's UE downloads one or parts (i.e., segments) of the basketball game from the content cache server 108 (e.g., into cache memory of the UE) and Jessica begins to watch the basketball game.

(4) Jessica's UE periodically announces to the Tracker 116 which parts of the basketball game are presently maintained in its cached memory. The aspect of a UE announcing possession of content is referred to hereinafter as "advertising" of content. Where applicable, content cache servers and/or other UEs also advertise possession of content to the Tracker 116, so that the Tracker continuously (or nearly continuously) "tracks" which resources are maintaining which segments of content. Coincident to Jessica's advertisement of content, Jessica's UE receives an updated list of content cache servers and/or other peer UEs that have received some parts of the basketball game.

(5) As time goes by, more and more users in Domain 1 join the watching queue of the basketball game and the content cache server 108 begins to become overloaded. For purpose of example, presume that as of the latest Tracker update (step 4), Jessica's UE knows that Jason, Alice and Bob's UEs have some cached parts of the basketball game. Accordingly, Jessica's UE may attempt to download some parts of the basketball game from Jason, Alice and/or Bob's UE for more efficient content distribution and to decrease the workload of the content cache server 108.

B. Use Case 2: Content-on-Demand Service for Multiple Online Users

Figure 3:
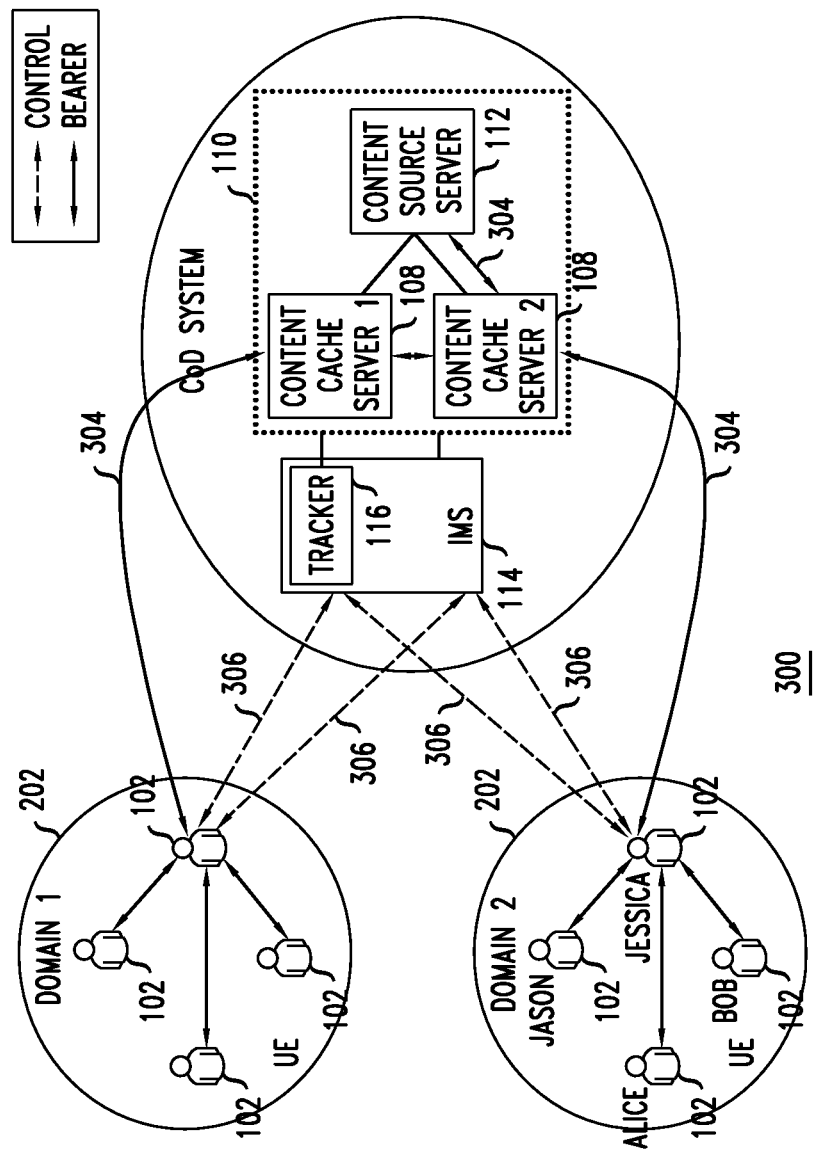
FIG. 3 depicts an example use of an IMS-based P2P Content Distribution System for providing Content-on-Demand Service for multiple online users.

FIG. 3 is an illustration of the use of an IMS-based P2P Content Distribution System 300 for providing Content-on-Demand Service for multiple online users. For convenience, like elements of FIG. 3 relative to FIG. 1 and FIG. 2 will be identified with the like reference numerals.

A plurality of user icons 102 represent multiple online users (and UE) operating within a plurality of logical domains 202 (as shown, "Domain 1" and "Domain 2"). The user icons 102 identify four IMS subscribers in each domain 202, (unnamed in Domain 1 and named Jessica, Bob, Jason and Alice in Domain 2). The domains 202 may comprise, for example, separate logical domains of two different IMS service providers or separate geographic domains of a single service provider. The users 102 access multimedia service and content by communicating with an IP Data Network 110 and IMS Core 114. As shown in FIG. 3, the IP Data Network includes two content cache servers 108 ("Content Cache Server 1" and "Content Cache Server 2") and a content source server 112 for distributing multimedia content; and the IMS Core 114 includes various functional elements, including, without limitation, a tracker 116 to perform functions such as client enrollment, content indexing, browsing and searching functions. Bearer traffic 304 is denoted by solid lines and control traffic 306 is denoted by dashed lines.

In the example use case, it is presumed that Jessica is an IMS subscriber within Domain 2 and desires to watch an on-demand movie on her UE 102 (e.g., from "IMS Online Movie Theatre").

(1) Jessica starts her IMS P2P application client and begins the IMS registration process. After Jessica finishes her registration, the IMS P2P application delivers program information (e.g., a list/menu of on-demand programs) to the client. Jessica searches and selects a movie from the program list to indicate to the P2P application that she wants to begin watching the movie.

(2) After receiving Jessica's request, the P2P application queries the locations of the film storage resources of the selected movie and sends back to Jessica a list of the resource locations. For purpose of example, it is presumed that the selected movie is segmented into 10 parts (e.g., Part 1, Part 2, etc.), the content source server 112 has all of the 10 parts and the content cache servers 108 have only an initial portion (e.g., Part 1 and Part 2) of the 10 parts. Presume that responsive to Jessica's request, the P2P application tells Jessica that she may download the movie from Content Cache Server 2.

(3) Jessica's UE queries the Content Cache Server 2 to determine which parts of the movie are available to download from the Content Cache Server 2. The Content Cache Server 2 informs Jessica's UE that Parts 1 and 2 are available to download.

(4) Jessica's UE downloads Parts 1 and 2 from the Content Cache Server 2 (e.g., into cache memory of the UE) and Jessica begins to watch the movie.

(5) Jessica's UE periodically announces (or "advertises") to the Tracker 116 which parts of the movie are presently maintained in its cached memory and receives updated information from the Tracker 116 that identifies where other parts of the movie have been distributed (for example, Content Cache Servers or peer UEs). When Jessica finishes watching Parts 1 and 2 (i.e., retrieved from the Content Cache Server 2), Jessica's UE may retrieve the rest of the parts from the Content Source Server 112 or where indicated by the Tracker 116.

(6) As time goes by, more and more users around Jessica (i.e., in Domain 2) join the watching queue of the movie and they receive Parts 1 and 2 from the Content Cache Server 2 and further parts from the Content Source Server 112, at least initially, causing the Content Source Server to become congested. Fortunately, from step (5), the users may periodically become aware of alternative storage resources of the movie as indicated by the Tracker 116, and may access those resources to relieve the workload of the Content Source Server 112. For purpose of example, presume that as of the latest Tracker update, the users in Jessica's domain know that further parts of the movie may now be obtained from Content Cache Server 1 and they begin to download parts of the movie from Content Cache Server 1.

(7) More time goes by, and still more users in Domain 1 and 2 join the watching queue of the movie and now Content Cache Servers 1 and 2 are getting overloaded. Now presume that as of the latest Tracker update, Jessica's UE knows that further parts of the movie may be obtained from her three neighbor UEs Jason, Bob and Alice, so Jessica's UE tries to download parts of the movie from one or more of the neighbor UEs.

III. Problem Statement and Solution

From the description of the use cases above, it is evident that an important aspect of P2P content distribution service is the advertisement of content possession from UEs and/or content cache servers, where applicable, to the Tracker, which maintains a list of UEs and/or content cache servers possessing content at any given time. One major security threat exists in the possible false advertisement of content (e.g., by a malicious peer that does not possess the advertised content), which could lead to false information maintained by the Tracker and a waste of resources and time at the client peer side. This threat is addressed by related U.S. patent application Ser. No. 13/344,826 which is directed to verification of content possession by an announcing peer (i.e., determining the truth or falsity of advertised content possession) in a P2P content distribution system.

Furthermore, a threat exists following a successful advertisement of content (wherein an announcing peer has been verified to possess an advertised content item) that the announcing peer may maliciously (or perhaps mistakenly) share content with a receiving peer that is different in some way from the advertised or requested content. For example, an advertising peer might share content that has been tampered with in some manner or includes a malicious piece of software; or content that is otherwise legitimate but that was not requested by the receiving peer. In this case, the receiving peer would obtain from the tracker a correct peer-list but the receiving peer would not obtain the requested content. Again, this could lead to waste of resources and time at the client peer side, not to mention potential damages to the peer UE. To address this threat, embodiments of the present invention are directed to verification of integrity of peer-supplied content in a P2P content distribution system.

Figure 4:
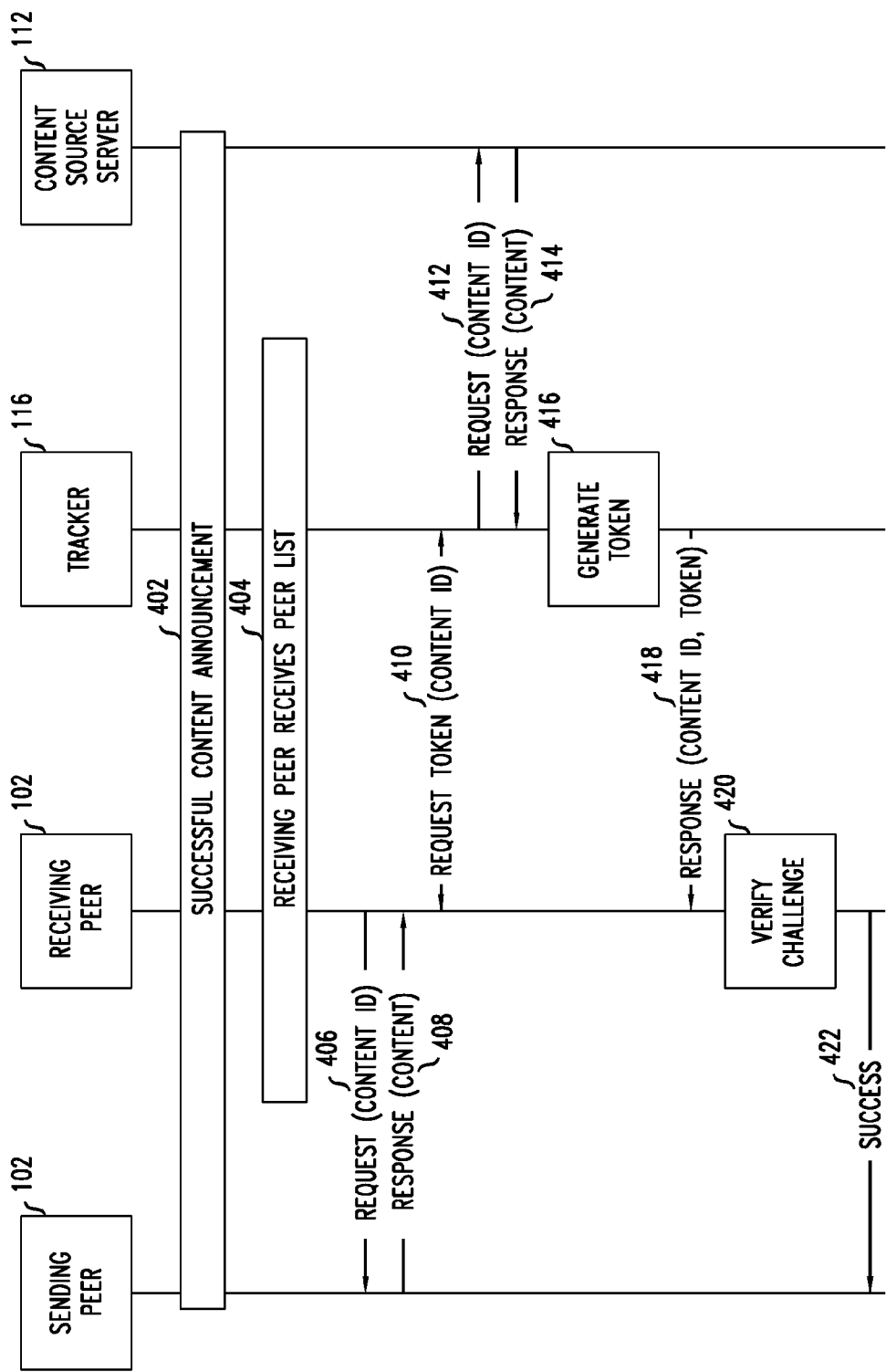
FIG. 4 illustrates a message sequence for verification of integrity of peer-supplied content according to an embodiment of the invention.

Referring now to FIG. 4, a message sequence is shown for verification of integrity of peer-supplied content according to an embodiment of the invention. The steps of FIG. 4 are performed, where applicable, by a sending peer 102, a receiving peer 102, the Tracker 116 and the Content Source Server 112 of a P2P content distribution system such as shown in FIG. 1, FIG. 2 or FIG. 3.

At block 402, it is presumed that the sending peer (e.g., "Jason") has made a successful content announcement, i.e., prior to sending any content, Jason's UE advertised possession of a content item and was verified by the tracker to possess the advertised content item. For example, with reference to the use case described in relation to FIG. 3, the tracker might confirm following an advertisement from Jason's UE that Jason possesses Part 3 of Jessica's selected movie. Coincident to the successful announcement, the tracker 116 updates its peer list to indicate that the announcing peer is confirmed to possess the advertised content. At block 404, the receiving peer (e.g., "Jessica") obtains the peer list so as to become aware of which content items are possessed by the sending peer.

At step 406, the receiving peer requests an item (or items) of content possessed by the sending peer. The request includes the "ContentID" or other indicia of the content. Responsive to the request, at step 408, the sending peer sends a content item (or items) to the receiving peer and the content item(s) are received by the receiving peer. As has been noted, it is possible that the peer-supplied content may differ at least in part from the advertised or requested content. At step 410, to verify the integrity of the peer-supplied content, the receiving peer requests a verification token from the tracker. The request includes the "ContentID" or other indicia of the requested content. For example, with reference to the use case described in relation to FIG. 3, supposed that Jessica requests Part 3 of a selected movie from Jason's UE, yet Jessica's UE receives a tampered-with version of Part 3 or a different content segment altogether. Jessica's UE may request a verification token from the tracker (e.g., associated with Part 3 of "Transformer") so as to help ascertain whether the received content differs from the requested content.

In one embodiment, the tracker itself generates the token and to do so it must possess the advertised content itself or it may obtain the content from the Content Source Server 112. Accordingly, in the message sequence of FIG. 4, it is presumed the Tracker does not itself possess the advertised content; and at steps 412, 414, the Tracker requests and obtains the advertised content from the Content Source Server 112.

Once the advertised content is obtained, the Tracker will generate a token that can be used by the receiving peer to verify the integrity of the peer-supplied content. The token for example can be a hash of the advertised content (e.g., the entire content) or in the preferred embodiment, a hash of a random part of the advertised content. As is well known, a hash is a cryptographic function that takes as input an arbitrary block of data and produces as output a hash value; and two inputs will not result in the same hash value unless the two inputs are identical.

A token based on a random part of the content may be equated to creating a random question about the content itself which can be correctly answered only if the nominal possessor of the content has the authentic content. For example, using a book analogy, a challenger may ask a nominal possessor of a particular book for the seventh letter of twentieth word on page 72 of the book. Without really having the book, or perhaps having a different version of the book, the nominal possessor would not be able to answer the question. In the case of digital multimedia content, a challenger may ask a nominal possessor to confirm possession of a specific block of authentic content, where the beginning of the block and the length of the block are randomly selected. A good representation of the answer would be a hash of this block and in view of the randomness of the question, the hash need not be secure.

At step 416, in accordance with the preferred embodiment, the Tracker randomly selects a block of the advertised content (e.g., a block beginning at a specified bit and having a specified length) and generates a token based on the selected block of authentic advertised content. In one embodiment, the token is derived by performing a hash of the randomly selected block. As noted, in view of the randomness of the block, the hash need not be secure. For example, in the case where Jessica has requested a verification token corresponding to Part 3 of a selected movie, the Tracker (having obtained an authentic copy of Part 3) selects a random block from Part 3 beginning at specified bit and having a specified length and generates a token comprising a hash of the selected block. At step 418, the tracker sends a response to the receiving peer that includes the token. In one embodiment, the response includes the "ContentID" or other indicia of the requested content and indicia of the random block (for example by indicating a beginning bit number and length of the block) and hash function from which the token was derived.

Alternatively, at step 416, to achieve an additional layer of security and prevent replay attacks, the Tracker may generate a random seed value and generate the token based on a combination of the randomly selected block and the random token. For example and without limitation, the Tracker may generate a token by performing a hash of the randomly selected block combined with the random seed value. Where applicable, at step 418 the tracker includes the random seed value in the response to the receiving peer.

At step 420, the receiving peer verifies the integrity of the content received from the sending peer, for example, by comparing the token received from the tracker (i.e., based on a random sample obtained from the authentic copy) to a token generated by itself in corresponding fashion (i.e., based on a corresponding random sample obtained from the peer-received content and random seed value, where applicable). If the tokens are the same, the receiving peer is assured of the integrity of the peer-received content and at step 422, the receiving peer informs the sending peer of the successful verification. But if the tokens are not the same, the verification fails and the receiving peer discards the content. Optionally, the receiving peer may inform the sending peer as well as the tracker node about the failed verification.

FIG. 5 shows a message sequence for verification of integrity of peer-supplied content according to an alternative embodiment of the invention. The steps of FIG. 5 are performed, where applicable, by a sending peer 102, a receiving peer 102, the Tracker 116 and the Content Source Server 112 of a P2P content distribution system such as shown in FIG. 1, FIG. 2 or FIG. 3.

At block 502, it is presumed that the sending peer (e.g., "Jason") has made a successful content announcement, i.e., prior to sending any content, Jason's UE advertised possession of a content item and was verified by the tracker to possess the advertised content item. Coincident to the successful announcement, the tracker 116 updates its peer list to indicate that the announcing peer is confirmed to possess the advertised content. At block 504, the receiving peer (e.g., "Jessica") obtains the peer list so as to become aware of which content items are possessed by the sending peer.

At step 506, the receiving peer requests an item (or items) of content possessed by the sending peer. The request includes the "ContentID" or other indicia of the content. Responsive to the request, at step 508, the sending peer sends a content item (or items) to the receiving peer and the content item(s) are received by the receiving peer. As has been noted, it is possible that the peer-supplied content may differ at least in part from the advertised or requested content. At step 510, to verify the integrity of the peer-supplied content, the receiving peer requests a verification token from the tracker. The request includes the "ContentID" or other indicia of the requested content. For example, with reference to the use case described in relation to FIG. 3, supposed that Jessica requests Part 3 of a selected movie from Jason's UE, yet Jessica's UE receives a tampered-with version of Part 3 or a different content segment altogether. Jessica's UE may request a verification token from the tracker (e.g., associated with an authentic copy of Part 3) so as to help ascertain whether the received content differs from the requested advertised content.

In the embodiment of FIG. 5, the Tracker does not possess or obtain the advertised content, neither does it generate the token. Rather, the Tracker at step 512 forwards the request for a verification token to the Content Source Server 112 which it knows to possess the authentic advertised content. The token for example can be a hash of the advertised content (e.g., the entire content) or in the preferred embodiment, a hash of a random part of the advertised content.

At step 514, in accordance with the preferred embodiment, the Content Source Server randomly selects a block of the advertised content (e.g., a block beginning at a specified bit and having a specified length) and generates a token based on the selected block of authentic advertised content. In one embodiment, the token is derived by performing a hash of the randomly selected block. For example, in the case where Jessica has requested a verification token corresponding to Part 3 of a selected movie, and this requested is forwarded from the Tracker to the Content Source Server, the Content Source Server (possessing an authentic copy of Part 3) selects a random block from Part 3 beginning at specified bit and having a specified length and generates a token comprising a hash of the selected block. At step 516, the Content Source Server sends a response to the Tracker that includes the token; and at step 518, the Tracker forwards the response to the receiving peer. In one embodiment, the response includes the "ContentID" or other indicia of the advertised content and indicia of the random block of the content and hash function from which the token was derived.

Alternatively, at step 514, to achieve an additional layer of security and prevent replay attacks, the Content Source Server may generate a random seed value and generate the token based on a combination of the randomly selected block and the random token. For example and without limitation, the Content Source Server may generate a token by performing a hash of the randomly selected block combined with the random seed value. Where applicable, at step 516 the Content Source Server includes the random seed value in the response to the Tracker and this random seed value is forwarded to the receiving peer along with the token at step 518.

At step 520, the receiving peer verifies the integrity of the content received from the sending peer, for example, by comparing the token generated by the Content Source Server and forwarded from the tracker (i.e., based on a random sample obtained from the authentic copy) to a token generated by itself in corresponding fashion (i.e., based on a corresponding random sample obtained from the peer-received content.) If the tokens are the same, the receiving peer is assured of the integrity of the peer-received content and at step 522, the receiving peer informs the sending peer of the successful verification. But if the tokens are not the same, the verification fails and the receiving peer discards the content. Optionally, the receiving peer may inform the sending peer as well as the tracker about the failed verification.

FIGS. 1-5 and the foregoing description depict specific exemplary embodiments of the invention to teach those skilled in the art how to make and use the invention. The described embodiments are to be considered in all respects only as illustrative and not restrictive. The present invention may be embodied in other specific forms without departing from the scope of the invention which is indicated by the appended claims. All changes that come within the meaning and range of equivalency of the claims are to be embraced within their scope.

For example, embodiments are described herein with reference to an IMS-based network topology. However, it is to be appreciated that principles of the invention, while applicable to an IMS-based network, are not intended to be so limited. Rather, embodiments of the present invention are generally applicable to any type of communication network or hybrid network that relies upon P2P technology to facilitate multimedia content distribution.

What is claimed is:

1. In a peer-to-peer content distribution system including a plurality of peer nodes operably linked to a tracker node, the peer nodes including a sending node and a receiving node, a method, carried out by the tracker node, comprising:
   receiving, from the receiving node, a request for a verification token associated with a received content item, the received content item having been received from the sending node responsive to a request for an advertised content item, the request for verification token including indicia of the advertised content item;
   obtaining a verification token based on a random singular portion of the advertised content item, the random singular portion beginning at a specified bit; and
   sending, to the receiving node, a response including the verification token, indicia of the advertised content item and indicia of the random portion of the advertised content item from which the token was generated, the receiving node thereafter being operable to (a) generate a second token based on a corresponding random portion of the received content item and (b) verify that the received content item matches the advertised content item if the second token matches the verification token;
   wherein the step of obtaining the verification token comprises:
   obtaining the advertised content item;
   selecting a random singular portion of the advertised content item;
   generating a random seed value; and
   performing a hash of the random portion and the random seed value, yielding the verification token.

2. The method of claim 1, wherein the step of obtaining the verification token comprises:
   obtaining the advertised content item;
   selecting a random singular portion of the advertised content item; and
   performing a hash of the random portion, yielding the verification token.

3. The method of claim 1, wherein the step of obtaining the verification token comprises:
   identifying a content storage node possessing the content item;
   requesting the verification token from the content storage node, the content storage node thereafter (a) obtaining the advertised content item; (b) selecting a random singular portion of the advertised content item; and (c) performing a hash of the random portion, yielding the verification token; and
   receiving the verification token from the content storage node.

4. The method of claim 1, wherein the step of obtaining the verification token comprises:
   identifying a content storage node possessing the content item;
   requesting the verification token from the content storage node, the content storage node thereafter (a) obtaining the advertised content item; (b) selecting a random singular portion of the advertised content item; (c) generating a random seed value; and (d) performing a hash of the random portion and the random seed value, yielding the verification token; and
   receiving the verification token from the content storage node.

5. Apparatus for verifying integrity of content received at a receiving node, in accordance with a peer-to-peer content distribution system including a plurality of peer nodes operably linked to a tracker node, the apparatus at the tracker node comprising:

a peer node interface;
a content storage node interface;
a memory; and
at least one processor operably coupled to the peer node interface, content storage node interface and memory and configured to:
(a) receive, from the receiving node, a request for a verification token associated with a received content item, the received content item having been received from a sending node responsive to a request for an advertised content item, the request for verification token including indicia of the advertised content item;
(b) obtain a verification token based on a random singular portion of the advertised content item, the random singular portion beginning at a specified bit obtain the advertised content item; select a random singular portion of the advertised content item; generate a random seed value; and perform a hash of the random portion and the random seed value, yielding the verification token; and
(c) send, to the receiving node, a response including the verification token, indicia of the advertised content item and indicia of the random portion of the advertised content item from which the token was generated, the receiving node thereafter being operable to (1) generate a second token based on a corresponding random portion of the received content item and (2) verify that the received content item matches the advertised content item if the second token matches the verification token.

6. The apparatus of claim 5, wherein the processor at part (b) is configured to
obtain the advertised content item;
select a random singular portion of the advertised content item;
perform a hash of the random portion, yielding the verification token.

7. The apparatus of claim 5, wherein the processor at part (b) is configured to
identify a content storage node possessing the content item;
request the verification token from the content storage node, the content storage node thereafter (a) obtaining the advertised content item; (b) selecting a random singular portion of the advertised content item; and (c) performing a hash of the random portion, yielding the verification token; and
receive the verification token from the content storage node.

8. The apparatus of claim 5, wherein the processor at part (b) is configured to
identify a content storage node possessing the content item;
request the verification token from the content storage node, the content storage node thereafter (a) obtaining the advertised content item; (b) selecting a random singular portion of the advertised content item; (c) generating a random seed value; and (d) performing a hash of the random portion and random seed value, yielding the verification token; and
receive the verification token from the content storage node.

9. In a peer-to-peer content distribution system including a plurality of peer nodes operably linked to a tracker node, the peer nodes including a sending node and a receiving node, a method, carried out by the receiving node, comprising:

receiving, from the sending node, a received content item responsive to requesting an advertised content item;
sending, to the tracker node, a request for a verification token associated with a received content item, the request for verification token including indicia of the advertised content item;
responsive to the request, receiving a verification token based on a random singular portion of the advertised content item, the random singular portion beginning at a specified bit;
generating a second token based on a corresponding random portion of the received content item;
verifying that the received content item matches the advertised content item if the second token matches the verification token;
receiving a random seed value, and wherein the step of receiving a verification token includes receiving indicia of the random singular portion of the advertised content item from which the token was generated, the step of generating a second token comprising:
identifying the corresponding random portion of the received content item; and
performing a hash of the corresponding random portion and the random seed value, yielding the second token.

10. The method of claim 9, wherein the step of receiving a verification token includes receiving indicia of the random singular portion of the advertised content item from which the token was generated, the step of generating a second token comprising:
identifying the corresponding random portion of the received content item; and
performing a hash of the corresponding random portion, yielding the second token.

11. Apparatus for verifying integrity of content received at a receiving node, in accordance with a peer-to-peer content distribution system including a plurality of peer nodes operably linked to a tracker node, the apparatus at the receiving node comprising:
a memory; and
at least one processor operably coupled to the memory and configured to:
(a) receive, from the sending node, a received content item responsive to requesting an advertised content item;
(b) send, to the tracker node, a request for a verification token associated with a received content item, the request for verification token including indicia of the advertised content item;
(c) responsive to the request, receive a verification token based on a random singular portion of the advertised content item and a random seed value, the random singular portion beginning at a specified bit;
(d) identify the corresponding random portion of the received content item; and perform a hash of the corresponding random portion and a random seed value, yielding a second token; and
(e) verify that the received content item matches the advertised content item if the second token matches the verification token.

12. The apparatus of claim 11, wherein the processor at part (d) is configured to:
- identify the corresponding random portion of the received content item; and
- perform a hash of the corresponding random portion, yielding the second token.

* * * * *